Nov. 29, 1960  M. Y. A. M. SERRUYS ET AL  2,962,015
FUEL FEED TO ENGINES THROUGH A CARBURETOR
Filed March 5, 1958  4 Sheets-Sheet 1
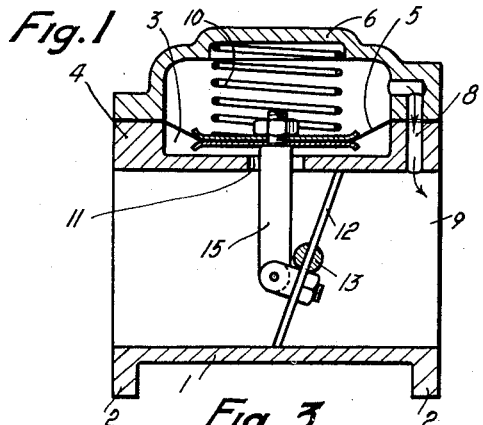
Fig. 1
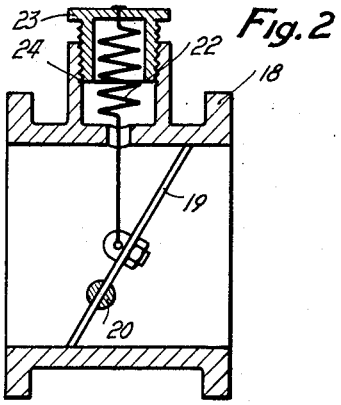
Fig. 2
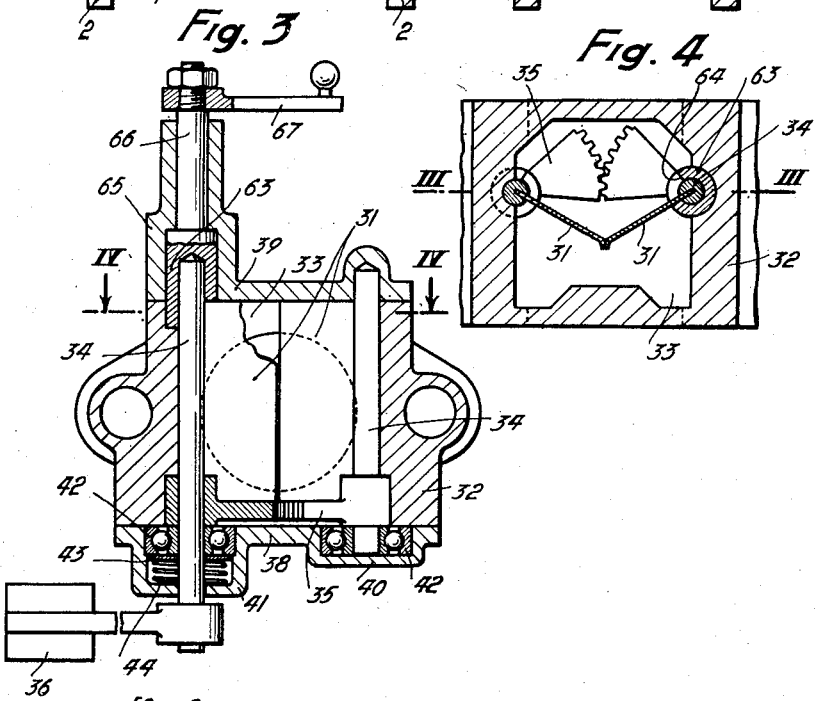
Fig. 3
Fig. 4
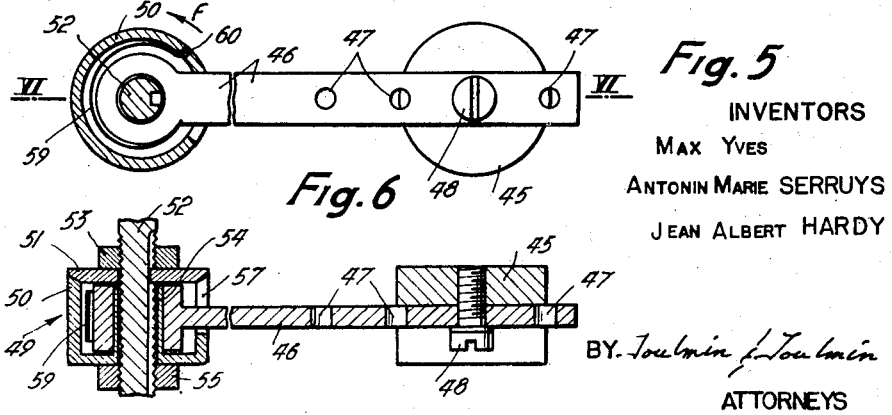
Fig. 5
Fig. 6
INVENTORS
Max Yves
Antonin Marie SERRUYS
Jean Albert HARDY
BY Toulmin & Toulmin
ATTORNEYS

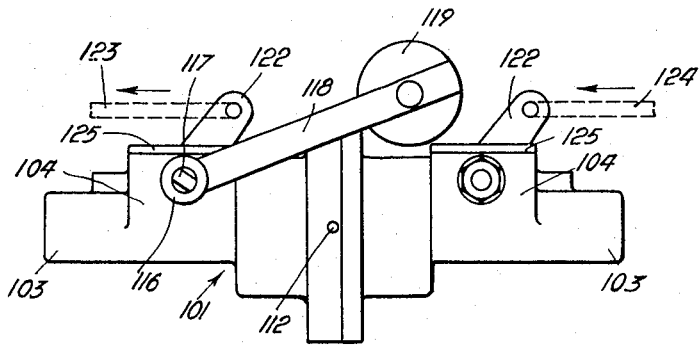
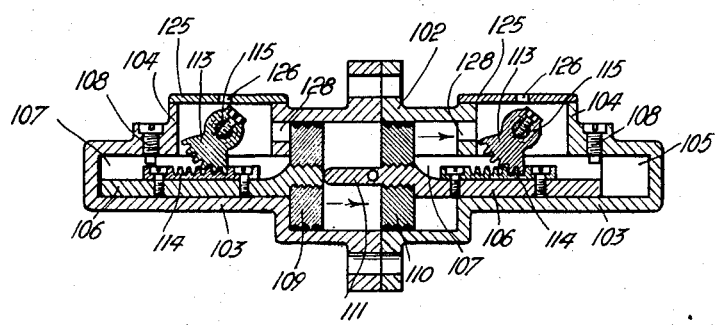
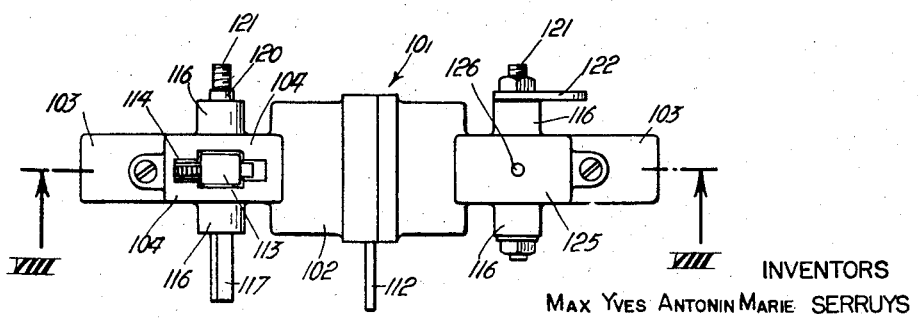

Nov. 29, 1960   M. Y. A. M. SERRUYS ET AL   2,962,015
FUEL FEED TO ENGINES THROUGH A CARBURETOR
Filed March 5, 1958   4 Sheets-Sheet 3

INVENTORS
MAX YVES
ANTONIN MARIE SERRUYS
JEAN-ALBERT HARDY

BY *Toulmin & Toulmin*
ATTORNEYS

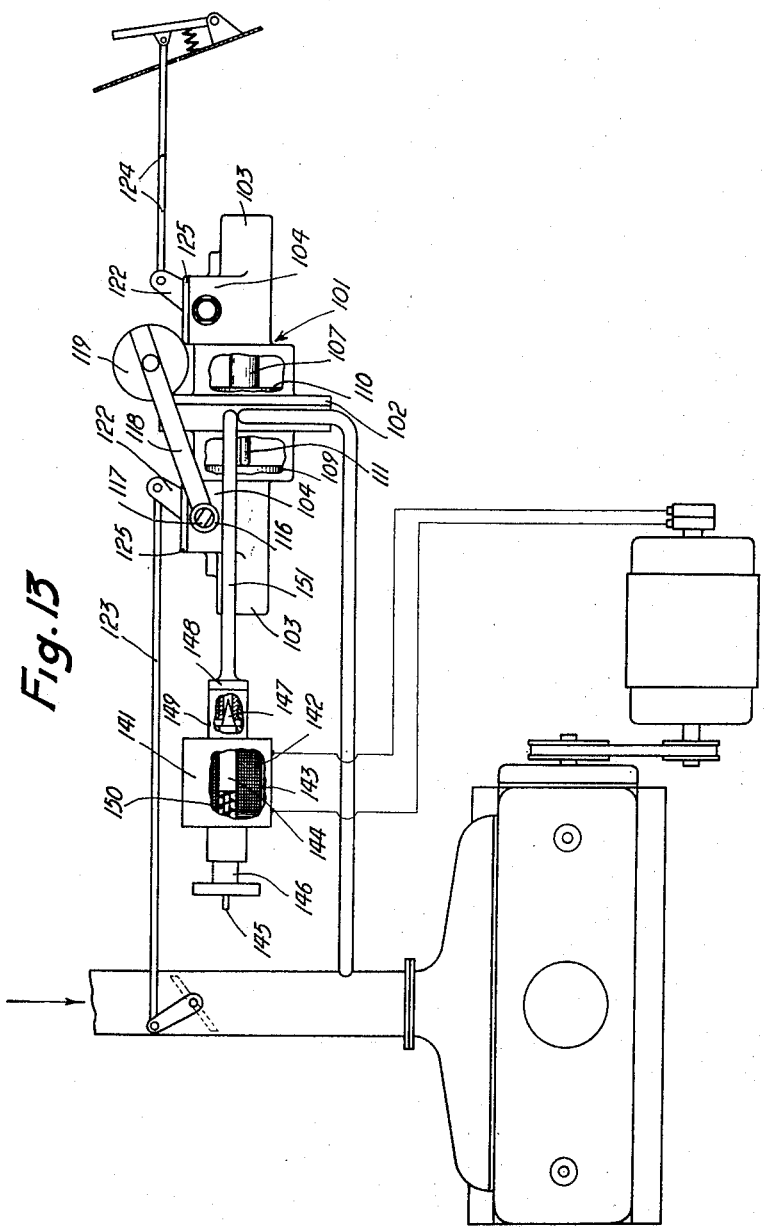

United States Patent Office

2,962,015
Patented Nov. 29, 1960

2,962,015

FUEL FEED TO ENGINES THROUGH A CARBURETOR

Max Yves Antonin Marie Serruys, 102 Rue du Bac, Paris 7, France, and Jean Albert Hardy, 12 Rue Dulac, Paris 15, France Filed Mar. 5, 1958, Ser. No. 719,333

Claims priority, application France Mar. 8, 1957

10 Claims. (Cl. 123—119)

The object of the present invention is to provide improvements in the fuel feed to engines through a carburetor, which improvements are preferably used in combination, since maximum advantage is thereby obtained, but which could also be used separately without departing from the scope of the invention.

One of these improvements consists in a method of self-control of the feed to the engine, which method is characterized in the self-maintenance in all conditions of engine performance, in particular in the case of deliberate rapid variations in engine speed (accelerations and decelerations) or variations to which the engine is subjected (sudden variations in the resistant torque), at a value at least equal to a pre-determined minimum of the degree of suction or depression prevailing at least in a pipe section leading to the engine of the part of the induction passageway located below, that is, on the downstream side of, the throttling means for said passageway provided for the deliberate control of the engine feed, said self-maintenance being obtained by the automatic actuation of throttling means for the induction passageway as a function of the pressure prevailing in said pipe section leading to the engine.

This self-maintenance of the degree of suction above a pre-determined minimum has for general effect to maintain fuel vaporization at a certain level at low speeds of passage of the stream of air through the induction passageway and to limit the suction difference or drop which otherwise occurs in the course of the sudden opening of the throttling means of the induction passageway, that is, during accelerations—which suction difference has for consequence a partial condensation of the fuel already vaporized on the upstream side of the throttling means and a coalescence of the fuel still in the state of droplets in said air stream—thus to oppose the phenomenon which heretofore led to defective carburation known under the name of "carburation gaps," which is usually remedied by the injection of an excess amount of fuel by means of devices known as accelerator pumps. But an increase in the fuel consumption resulted. The self maintenance of the suction above a pre-determined minimum eliminates this defective carburation, reduces or eliminates the need for injection of additional fuel for obtaining good accelerations and therefore permits the use of carburetors devoid of accelerator pumps and ensures an improved engine performance at low speeds when the resistant torque is high.

The scope of the invention embraces, in consequence, the combination of a device capable of maintaining the suction under all conditions of operations, notably in the case of rapid variations which are deliberate or occur on their own, at a value higher than a pre-determined minimum with a carburetor devoid of an accelerator pump.

A further object of the invention is to provide for carrying out the afore-mentioned method, self-control means controlling the effective cross-sectional area of the induction passageway between the fuel jet point in said passageway and the engine cylinder or cylinders to be fed with fuel. These self-control means comprise, disposed in a passageway, throttling means for the latter which are such that they are responsive to the pressure in said passageway below, that is, on the downstream side of said throttling means, whereby said throttling means tend, in opposition to a force which tends to return them to a position of maximum throttle effect, to open automatically when the suction in said passageway below said throttling means rises above a pre-determined limit.

An improvement, which could be advantageous to include in said self-control means, is to arrange them in such manner that said return force varies with the degree of opening of said throttling means, that is diminishes at least when the degree of opening approaches its maximum.

An other improvement is to provide the self-control means with means by which it is possible to regulate the intensity of said return force.

Said self-control means for controlling the feed could comprise an independent unit, the passageway in which their throttling means are located being then constituted by a section of pipe adapted to be inserted in the induction passageway extending from the carburetor to the induction tube of the engine. They could also be incorporated in the induction tube of the engine and form with this tube an independent unit. Alternatively, they could also be incorporated in the carburetor and constitute with the latter an independent unit.

An important development of the self-control means of the feed is to utilize them, when deliberately controlling the feed of the engine, in associating with the self-control means, to this end, a movable abutment actuable at will and limiting the degree of opening of their throttling means, this abutment being capable of actuating the throttling means in the direction to close them and being itself actuable by the usual control means controlling engine operation (control lever, motor vehicle accelerator pedal and the like). In this case, the butterfly valve, throttle or the like of the carburetor is dispensed with and replaced by said throttling means. Further, in this case, and in particular when the invention is incorporated in a carburetor in which the degree of minimum opening, determined by said abutment, of said throttling means determines the idling of the engine, there are provided regulating means for regulating said minimum degree of opening, for example a screw-operated abutment acting as a support for said throttling means in the position corresponding to idling of the engine or, preferably, directly for said movable abutment.

Said throttling means, which are part of the self-control means for the induction, could be constituted in various ways, for example by pivoting or sliding devices which, taken individually, are responsive to the suction in the induction passageway or, on the contrary, non-responsive to this suction, and, in this last case, are actuatable by auxiliary means which are responsive to said suction, for example by a diaphragm. They could be constituted by a single device or by two devices which are symmetrically disposed relative to the axis of the passageway and are in this case preferably positively coupled so as to move in a synchronism and symmetrically relative to said axis. Likewise, said return force could be that exerted by a spring, counterweight or atmospheric pressure. It is furthermore particularly advantageous that the return device have such inertia or high damping effect as to prevent beating or pumping phenomena which the passage of the gases could cause.

To this end, they could comprise a spring combined with any mechanical arrangement having sufficient inertia or with a liquid or air damping device. In the case of a return action by means of a counterweight, a damping abutment is advantageously provided for absorbing the kinetic energy of the counterweight at the end of its travel for closing the throttling means.

To facilitate the adaptation on an existing vehicle of the means embodying the invention, it is advantageous to arrange these means in the form of a servo-control characterized in that there is inserted in the transmission at a point between the control device controlling the engine operation and the throttling means for the carburated air passageway leading to the engine (which throttling means could be the conventional butterfly valve or throttle of a carburetor), means responsive to the difference of pressure between atmospheric pressure and that of the carburated or vaporized air on the downstream side of said throttling means, means acting on the transmission and thereby rendering it controlled by said pressure difference so that said throttling means is automatically closed under the effect of said means when this suction tends to drop below a predetermined value.

In a particular embodiment of such a servo-control, the transmission between the control device controlling engine operation and the throttling means of the carburated air passageway leading to the engine (which means could be the conventional but butterfly valve or throttle of a carburetor) comprises an upstream part extending from said control device to a movable abutment in such manner that the latter is actuatable in both directions by said control device and its position is thus determined by that of the latter, and a downstream part leading to said throttling means and connected in a unidirectional manner to the upstream part so that the latter can actuate it in the direction corresponding to the closure of the throttling means, whereas, in the opposite direction, said movable abutment merely limits the degree of possible opening of the throttling means and said means responsive to the pressure difference between the atmospheric pressure and that of the carburated air on the downstream side of said throttling means act on said downstream part in opposition to an opposing force urging said throttling means toward its position of maximum throttle effect.

In another embodiment, the servo-control comprises, inserted in the transmission between the control device controlling engine operation and the throttling means for the carburated mixture passageway leading to the engine, a set of articulated levers forming a toggle arrangement operated by said means responsive to the suction, for example through the medium of a connecting member, so that decrease in the angle of the V formed by the toggle arrangement actuates the throttling means in the direction of its closure and this decrease in the angle of the V occurs as a response to decrease in the suction beyond a predetermined limit value.

Whatever embodiment is adopted, the servo-control can be so arranged that the means responsive to the suction perform the function of driving means actuating the transmission merely by the force to which they are subjected to as a result of the fact that the suction drops below said pre-determined value.

Said means responsive to the suction could also include driving means, for example using fluid under pressure, which means are controlled by the suction, the transmission being actuated through said driving means.

Preferably, in the case of the aforementioned first embodiment, said abutment is itself urged by a force, which is a function of said pressure difference or suction in the opposite direction to the action thereon of said means responsive to said pressure difference.

In this way, all or a part of the thrust exerted by said means on the abutment can be compensated, for example cancelled out.

In a particular embodiment, said means and those by which said abutment is urged by a force which is a function of said pressure difference, constitute the movable or deformable walls of a chamber communicating with the part of the induction passageway on the downstream side of said throttling means.

It is particularly advantageous to arrange that said means responsive to the pressure difference, and contingently said abutment and its balancing means, if it exists, form a unit or a single apparatus which is bodily inserted in the transmission between the control device controlling engine operation and the throttling means for the induction passageway leading to the engine. Such an apparatus constitutes a new industrial product.

It is, furthermore, advantageous to arrange that the servo-control, whatever its construction, comprise in addition means permitting modifying the conditions of balance between the suction and the opposing force tending to produce the self-closing of the throttling means. These means could be so constructed as to act on the suction itself or to modify the opposing force or to act on a mechanism through the medium of which said two forces are rendered opposing.

In any case, in a particular application of such means, the latter are controlled by the speed of the engine. According as the speed of the engine chosen as the reference speed is the maximum speed of the engine or the idling speed of the engine, the servo-control acts as a maximum engine speed limiting device or maintains the idling speed constant irrespective of engine temperature. If it is desired to obtain both these effects, the servo-control comprises two different sets of these means controlled by the speed of the engine.

Preferably, the means responsive to the speed of the engine act under the control of adjusted or set means whose setting can be varied advantageously from the instrument panel of the vehicle so as to permit varying the value of the speed of the motor, chosen as the reference speed.

Preferably, means are provided to put the device maintaining the idling speed at a constant value out of action advantageously in an automatic manner, for example in response to the opening of the throttling means controlling engine operation.

Further features and advantages of the invention will be apparent from the ensuing description, with reference to the accompanying substantially diagrammatic drawings, to which the invention is in no way restricted.

In the drawings:

Fig. 1 shows an embodiment of the invention in the form of an independent device adapted to be inserted in the induction passageway of the engine on the downstream side of the carburetor, the device being shown in longitudinal section through the axis of the passageway;

Fig. 2 shows a modification of the device shown in Fig. 1;

Fig. 3 shows another embodiment of the invention in the form of an independent device incorporating means permitting dispensing with the conventional butterfly valve or throttle of the carburetor, this embodiment being shown in section taken along line III—III of Fig. 4;

Fig. 4 is a sectional view taken along line IV—IV of Fig. 3;

Fig. 5 shows on an enlarged scale a modification of the counterweight provided in the embodiment shown in Figs. 2 and 4, the counterweight being shown in projection on a plane perpendicular to its axis of rotation;

Fig. 6 is a sectional view taken along line VI—VI of Fig. 5;

Fig. 7 is an elevational view of the assembly of a first embodiment of the servo-control;

Fig. 8 is a corresponding longitudinal sectional view taken along line VIII—VIII of Fig. 9;

Fig. 9 is a corresponding plan view;

Fig. 13 is a diagrammatic view of a complete operative device embodying the combination of some of the devices separately illustrated in the preceding figures.

Figure 10:
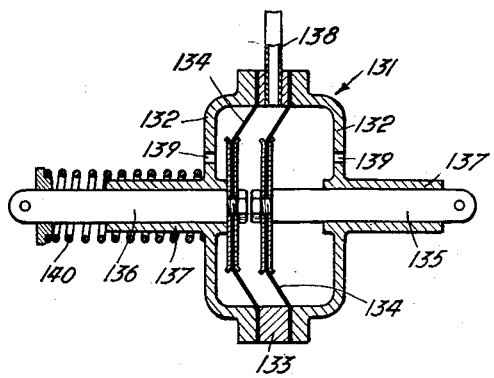
Fig. 10 is a longitudinal sectional view of a modification.

In the embodiment shown in Fig. 1, the device comprises a body 1 in the form of a section of pipe provided with connecting flanges 2 and adapted to be inserted by means of these flanges in that part of the induction passageway of an engine which is located on the downstream side of the carburetor. Exteriorly, the wall of the body 1 is so formed as to constitute a cup 3 having an edge 4 whose outer face is flat. Applied against the latter is a diaphragm 5 which closes the cup and is maintained in place by a cover 6 the inside of which communicates through a passageway 8 formed in the cover, diaphragm and pipe 1, with the interior 9 of pipe 1. Interposed between the cover 6 and the diaphragm 5 is a spring 10 which biases the diaphragm toward the bottom of the cup 3, which latter communicates with the interior of the pipe 1 by way of an aperture 11 formed in the bottom of the cup. Disposed inside the pipe 1 is a balanced throttling means which is constituted, in the presently-described embodiment, by a butterfly valve or throttle 12 carried by a rotatable shaft 13 perpendicular to the axis of the pipe 1 and so located that the throttle 12 is capable of closing, or substantially, closing that part of the pipe 1 between the passageway 8 and the aperture 11. The throttle 12 is connected to the diaphragm 5 by a link 15 of which one end is pivoted to the throttle and the other end is fixed to the diaphragm.

As the engine is located on the downstream side of the throttle 12, in the direction indicated by the arrow, and the carburetor on the upstream side of the throttle, it can be seen that the engine exerts a suction through the passageway 8 in the cover 6 and tends to deform the diaphragm 5 in opposition to the action of the spring 10 so that when the value of the suction is such as to overcome the force of the spring, the diaphragm 5 moves and through the medium of the link 15 turns the throttle 12 in the opening direction which tends to oppose an increase in this suction. If the conditions of operation are such that this suction nevertheless continues to increase, the throttle 12 opens still more. The arrangement is such that the throttle 12 cannot pass beyond the fully-open position. The value of the suction at which it is urged to this position depends, in the presently-described embodiment, on the initial compression and the law of compression of the spring 10. Preferably, a spring is selected whose flexibility is such that the thrust exerted thereby on the diaphragm remains substantially constant for all positions of the latter. The value of the suction maintained by the throttle in all its intermediate positions is therefore constant. As soon as the throttle is fully opened, the suction on the downstream side of the throttle can assume any greater value than the minimum value that it maintains constant in its other positions, which greater value depends on the instantaneous conditions of engine performance. As soon as this last value of the suction drops below the fixed minimum value, the throttle 12 tends to close on its own under the effect of the force exerted by the spring 10. Thus it can be seen that the suction on the downstream side of the throttle 12 or, in other words, the difference between the static pressures on the upstream and downstream sides of the throttle, cannot drop below a minimum value which is here fixed by the quotient of the force exerted by the spring 10 on the diaphragm divided by the area of the latter.

The means described hereinbefore therefore carry out the method of the invention.

In practice, to reconcile the desire to have at low engine speeds, apart from idling speed, a relatively high suction with the desire not to reduce the power of the engine when the throttle is fully opened and for a high resistant torque, there is chosen for this minimum value of the suction a suction between 40 and 100 g. per sq. cm.

In fact, the device just described is responsive to the difference between the static pressures on opposite sides of the throttle and non-responsive to the dynamic pressure on the upstream side of the throttle.

A modification of such a device, which also permits carrying out the method of the invention, is obtained by closing the aperture 11 around the link 15 and putting the part of the chamber 3 between the diaphragm 5 and the bottom of the cup in communication with the atmosphere. Thus modified, the device, which is still non-responsive to the dynamic pressure in the induction passageway on the upstream side of the throttle, is responsive to the pressure difference between the atmospheric pressure and that prevailing in the induction passageway on the downstream side of the throttle.

In the embodiment shown in Fig. 2, the device comprises, in the same manner as the device described hereinbefore, a body 18 in the form of a section of pipe similar to the pipe 1 and, located in this body, throttle means 19 constituted by a butterfly valve or throttle carried by journals 20 forming a pivot pin offset from its centre. The end of a spring 22 is attached to the throttle, the other end being fixed to a screw-threaded plug 23 which is screw-threadedly engaged in a hollow tapped boss 24 formed on the outer face of the body 18, so that the action of the spring 22 tends to maintain the throttle 19 in its pipe 18 closing position, or substantially in its pipe closing position. This device is mounted between the engine and the carburetor in the same way as the device shown in Fig. 1 and its operation differs from that of the device shown in Fig. 1 only in that the opening of the throttle 19 occurs, in opposition to the action of the spring 22, when the suction on the downstream side of the throttle 19 drops below the fixed minimum, not only as a function of the static pressures on the upstream and downstream sides of the throttle but also as a function of the dynamic pressure on the upstream side of the throttle. The adjustable plug 23 permits varying the tension of the return spring 22 and in consequence the value of the minimum suction that the device maintains on the downstream side of the throttle.

It will be understood that an adjustable plug similar to the plug 23 could be provided on the device shown in Fig. 1 for supporting the spring 10. To ensure the return of the throttle of its closing position it could be arranged in the devices shown in Fig. 1 and in Fig. 2, to replace the springs 10 or 22 by a counterweight fixed on the pivot pin of the throttle, the downward swing of the counterweight causing closure of the throttle. In this case, it is advantageous to so posititon the counterweight that the moment of its weight relative to the pivot axis is less when it is in the position corresponding to the fully open poistion of the throttle member than when it is in the position corresponding to that of the throttle member providing maximum throttle effect.

Another modification of the throttle means which is shown incorporated in the device shown in Fig. 3 but which may be substituted for the throttling means of the devices shown in Figs. 1 and 2, is constituted by two throttle members 31 or butterfly valves which are rectangular and are symmetrically disposed, relative to the axis of the section of pipe 32, inside a chamber 33 which has a square or rectangular cross-sectional shape and is inside the pipe. The throttle members 31 are respectively rigid with pivot pins 34 and extend solely, or at least for the major part, on one side of their pivot pin. These pins are supported in such manner as to be rotatable about their axes and the distance between the two pins 34 is less than the sum of the dimensions of the throttle members transversely of their pivot pins so that in the position of maximum throttle effect, the two throttles 31 abut one another as shown in Fig. 4. Disposed against one of the faces of the chamber 33 are two toothed sector-gears which are meshed with one another and are respectively keyed on the pivot pins 34 so that they combine the pivotal movements of the throttles 31 in such manner that they remain symmetrical relative to the axis of the induction passageway irrespective of their positions. To return the throttles to their closing position a counterweight 36 has been shown in Fig. 3 to be keyed on an extension of one of the pivot pins 34 outside the body 32. Alternatively, the return of the throttles could be effected by a spring as in the devices shown in Figs. 1 and 2. Instead of being disposed inside the body 32 the sector-gears 35 could be keyed on extensions of the pivot pins of the throttles outside the body and protected by a cover attached to the latter.

To interconnect the two throttles, there could also be used gear wheels or sector-gears which are not directly in mesh but interconnected through the medium of two intermeshed gears which are respectively meshed with said gears or sector-gears coaxial with the throttles, these intermediate gears being carried by spindles situated above or below the pivot pins of the throttles so as to reduce width to a minimum.

An advantage of this arrangement of two symmetrical throttles is that while the throttles are not fully open the stream of carbureted air is wiredrawn thereby increasing the homogeneity of the mixture by reducing the size of the droplets of fuel in suspension.

As shown in Fig. 3, to facilitate the mounting of the sector gear 35 the chamber 3 has been opened on two opposed sides parallel with the axis of the passageway through the body 32 and these open sides are closed by plates 38 and 39 held in position by screws. Recesses are formed in these plates for supporting the ends of the pivot pins 34. To this end, the plate 38 is provided with hollow bosses 40 and 41 which are coaxial with the pivot pins and receive ball bearings 42 for the latter. As the bottom of the boss 41 is traversed by the end of the pin 34 on which the counterweight 36 is fixed, a sealing ring 43 for example of plastic material is interposed between the bearing 42 and the outer end of the boss 41 and biased by a spring 43, disposed between the ring and the outer end of the boss, against the outer and inner ball races so as to prevent entry of air.

When a counterweight is used as a return means for returning the throttling means to their position of maximum throttle effect, it is advantageous, whatever the type of the throttle means, that the counterweight be movable along the arm carrying the latter, as shown for example in Figs. 5 and 6 where the counterweight in the form of a block 45 is movable along an arm 46 provided with spaced holes 47. A screw 48 holds the weight 45 in any of the available positions by passing through any one of the holes 47 in the arm 46 and screw-threadedly engaging the weight.

Figs. 5 and 6 also show an advantageous arrangement of a damping device for the end of travel of the counterweight. This device comprises a housing which is generally indicated by the reference character 49 and comprises a cup 50 and a closing cover 51. The latter, which is provided with a central aperture having an inwardly extending lug, is mounted on the end 52 of the pivot pin of a throttle member, which end is screw-threaded, has a longitudinal groove and is held in position by a nut 53, the lug engaging the longitudinal groove. The cup 50 has an inner hub 54 which is constituted in the presently-described embodiment by a sleeve which is attached too the centre of the cup and freely mounted on the screw-threaded extension 52. A nut 55 outside the cup 50 clamps the latter against the cover 51. Freely mounted on the inner hub 54 is the enlarged end of the arm 46 which is provided with an aperture. The arm 46 extends out of the housing 49 through an opening 57 in the lateral wall of the cup 50, this opening permitting the arm to turn through a certain angle relative to the housing 49. A curved plate spring 59 is interposed between the enlarged end of the arm 46, which it surrounds, and the lateral wall of the cup 50. The spring has an outwardly curved end which is engaged in a slot or recess 60 formed in the lateral wall of the cup, whereas its other end is free and merely bears against the arm 46 when the counterweight 45 is in its lower position. It can be seen that the arm 46 is pivotable in the direction of arrow F (Fig. 5), that is, in the direction corresponding to the opening of the throttle member, the arm 46 being driven by the housing 49 through the medium of the spring 59. In pivoting in the opposite direction, the arm 46 drives firstly the spindle 52 through the medium of the spring 59 and housing 49, and then, at the end of the travel of the spindle 52, it moves relative to the housing 49 and elastically deforms the spring 59 owing to its kinetic energy, the spindle 52 and the housing 49 remaining stationary so that its movement is retarded and its kinetic energy absorbed; the spring 59 then returns the arm to its normal position of rest.

This arrangement of the counterweight for returning the throttle means also permits, by the angular displacement of the cup 50 relative to the spindle 52, modifying the position of rest of the arm 46 corresponding to the position of maximum throttle effect in the induction passageway and at the same time modifying the position of the arm 46 corresponding to the position of maximum opening of the throttling means. In other words, it permits for a given position of the counterweight 45 on the arm 46, modifying, according to different velocity ratios, the return torque in the two extreme positions, whereas the displacement of the counterweight 45 along the arm 46 modifies them according to the same ratio.

Fig. 3 also shows an embodiment of means whereby the self-control engine feed throttles are also used in the deliberate control of this feed. To this end, there is disposed in the path of one of the throttles 31 a movable abtument, formed in the presently-described embodiment by a sleeve 63 capping the end of the pivot pin of the throttle and comprising a local aperture 64 through which the throttle 31 extends, this aperture being such as to permit the full pivotal movement of the throttle between its position of maximum throttle effect and its position of a fully opened throttle. Said end of the throttle pin is rotatable inside the sleeve so that the latter acts as a bearing, it being disposed inside a boss 65 carried by the plate 39. This sleeve 63 extends through the boss in the form of a control rod 66 at the end of which is fixed a control lever 67 which is connected by any suitable means to the control member controlling engine operation (control lever, vehicle accelerator pedal or the like). One of the edges of the aperture 64 thus constitutes an abutment for the throttles 31 which limits their degree of self-opening so long as it has not been completely retracted by rotation of the sleeve 63 by means of the rod 66 and control means comprising the lever 67. Thus, the acceleration of the engine is not controlled positively by the positive actuation of the throttling means for the induction passageway, which means consists in the presently-described embodiment of merely the throttles 31, but by the retraction of a movable abutment limiting the degree of opening of these throttles. On the other hand, this abutment acts positively on the throttles in the direction of their closure, that is, when slowing down the engine.

It will be understood that the cross-section of the induction passageway can be of any shape, for example round, square, rectangular, or elliptical. It is moreover obvious that all the arrangements described could be incorporated in a carburetor or in an induction pipe instead of being part of an independent device.

In the embodiment shown in Figs. 7–9 the device comprises a body which is generally designated by the reference character 101 and whose central part is formed by a cylinder 102. This body 101 consists of two assembled halves, their joint plane being perpendicular to the axis of the cylinder 102. The latter is extended at each end by an extension 103 which has a lateral boss 104 and a bore 105 coaxial with the cylinder. Slidable in each of the bores 105 is a cylindrical rod 106 having a longitudinal recess 107 in which is engaged the end of a screw 108 which is screwed in the extension 103 and guides the rod 106 in the longitudinal direction while preventing it from rotating. Pistons 109 and 110 fitted in the cylinder 102 are respectively fixed to the ends of the rods 106. The assembly formed by one of the rods 106 and piston 110 carries an abutment or finger 111 located between the pistons 109, 110. A passageway 112 which communicates with the induction passageway of the engine on the downstream side of the throttling means for this passageway communicates with the cylinder 102 at a point chosen in such manner as to be always between the two pistons 109 and 110 irrespective of their positions. The bosses 104 are hollow and communicate with the bores 105. Disposed inside each boss 104 is a sector-gear 113 which extends into the bore 105 and is meshed with a rack 114 fixed on the corresponding rod 106. This sector-gear 113 is fixed to a spindle 115 which is rotatably mounted in bearings 116 provided on the two opposed sides of the boss. The spindle 115 associated with the piston 109 extends out of one of the bearings 116 in the form of a flat-faced extension 117 on which is mounted a lever 118 carrying a counterweight 119. At its other end, this spindle 115 and the spindle 115 associated with the piston 110 are extended by a square-sectioned portion 120 and a screw-threaded portion 121. Mounted on each portion 120 is an arm 122, the two arms 122 being orientated in the same direction (Fig. 7). Pivoted to the arm associated with the piston 109 and with the arm 118 having the counterweight 119, is a rod 123 which is connected to the abutment (not shown in the drawing) which limits the degree of opening of the throttling means for the induction passageway of the engine, and pivoted to the other arm 122 is a rod 124 which leads to the control member controlling engine operation, which is generally the accelerator pedal of a motor vehicle. The interiors of the hollow bosses 104 communicate with the exterior through openings covered by covers 125 provided with an aperture 126 adapted to allow the atmospheric pressure to prevail within the body 101 on either side of the pistons 109, 110 owing to provision in particular of apertures 128 formed in the end walls of the cylinder 102 between the interior of the latter and the interior of the hollow bosses 104. If desired, a felt could be interposed between the covers 125 and the body 101 to prevent dust from entering while allowing the pressure in the boss to remain equal to the atmospheric pressure.

Owing to the suction between the pistons 109 and 110, the latter are subjected to equal and opposite forces due to the atmospheric pressure prevailing at each end of the cylinder and these two forces cancel one another through the medium of the finger 111.

When the rod 124 is shifted by depressing the accelerator pedal of a vehicle, for example, so as to open the throttling means, the piston 110 moves in the direction of arrow $f$ so that the finger 111 moves in a direction away from the piston 109 which, being subjected to the suction in the cylinder 102 between the pistons 109 and 110 corresponding to that in the induction passageway of the engine, then follows the movement of the finger 111 and the piston 110. Opposed to the movement of the piston 109 under the effect of this suction is the force exerted by the counterweight 119, so that if this suction drops below an excessively low value, the piston 109 cannot follow the movement of the piston 110 and the throttling means ceases to open, and even more or less closes, until the suction has resumed a sufficient value. Likewise, if in any intermediate position of the piston 110 the suction in the cylinder 102 assumes an excessively low value, the piston 109, under the effect of the counterweight 119 is moved away from the finger 111 and causes the throttling means for the induction passageway of the engine to close until the suction has resumed the required value.

When a pull is exerted on the rod 124, owing to the action of the return spring of the usual accelerator pedal, the piston 110 is moved in the opposite direction to the arrow $f$ through the medium of the corresponding sector-gear 113 and rack 114. In this movement the finger 111 encounters the piston 109 and causes it to participate in this movement which, through the medium of the rack 114 and sector-gear 113 associated therewith, turns the corresponding arm 122 in the same direction as the arm 122 associated with the piston 110 so that the rod 123 moves in the same direction and to the same extent as the rod 24 as though these rods were directly connected. The abutment which is actuated by the rod 123 and limits the opening of the throttling means for the induction passageway in consequence returns the throttling means to its closing position.

It can be seen that the device thus constructed is very easily mounted since it is sufficient to insert it in the linkage between the accelerator pedal of a vehicle and the throttling means for the engine induction passageway by pivoting to the arms 122 two parts of the linkage.

In the embodiment shown in Fig. 10, the device comprises a hollow body which is generally designated by the reference character 131 and consists of two identical cups 132 applied at their edges against the opposite sides of a ring 133. Two diaphragms 134 are disposed respectively between the ring 133 and the cups 132. Rods 135 and 136 are slidably mounted in the transverse ends of the cups and guided by outer bosses 137 extending from these ends. Each of the rods 135, 136 has its end inside the body 131 fixed to the nearest diaphragm, and the space between the two diaphragms 134 permanently communicates by way of an outer pipe 138 with the induction passageway of the engine on the downstream side of the throttling means for this passageway. Apertures 139 formed in the transverse ends of the cups 132 put the interior of the body 131 on both sides of the diaphragms 134 in permanent communication with the atmosphere. A spring 140 biases the rod 136 in the opposite direction to the force exerted thereon by the difference in the pressure on either side of the diaphragm 134 fixed to the rod 136.

This embodiment operates in a similar way to the embodiment shown in Figs. 7 and 9, the rods 135 and 136 being connected respectively to the part of the linkage which is connected to the control member controlling engine operation and to the linkage connected to the throttling means for the induction passageway of the engine.

In order to limit as far as possible the exchanges of air with the exterior when the pistons 109 and 110 or the diaphragms 134 move, it is advantageous to put the compartments of the body 101 or of the body 131 situated on both sides of the pistons and diaphragms in communication with one another by way of passageways formed in the wall of the body of the device or by way of an external pipe.

Figure 11:
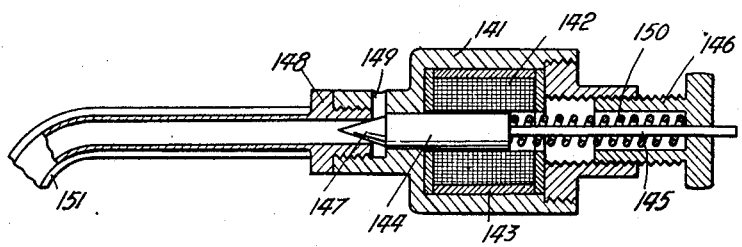
Fig. 11 is an axial sectional view of a device limiting the speed of the engine.

In the embodiment shown in Fig. 11 of means for modifying the conditions of equilibrium between the suction and the opposing force, these means are in the form of valve varying the suction in the induction passageway of the engine as a function of the running speed of the latter. This valve comprises a body 141 in which is disposed a coil 142 of electric wire wound round a soft iron armature 143. Disposed on the axis of this coil is a soft iron plunger 144 extended at one end by a lead guide rod 145 which is slidable in a screw-threaded plug screw-threadedly engaged in the body 141. At its other end, the plunger 144 terminates in a pointer 147 which is adapted to close the end of a tube 148 screw-threadedly engaged on the body 141 and thus closes off communication between the tube and an air inlet aperture 149. A spring 150 disposed between the plunger 144 and the plug 146 permanently biases the plunger in such manner that the pointer 147 closes the tube 148.

Fixed on the tube 148 is a flexible pipe 151 which is put in communication with the part of the cylinder 102 located between the pistons 109 and 110 (Fig. 9).

The coil 142 is connected to an electric current generator driven by the engine and so arranged that the intensity of the current supplied increases with the speed of the engine.

When the current supplied to the coil 142 is sufficiently intense, the attraction of the coil on the plunger 144 overcomes the force exerted by the spring 150 and the plunger 144 moves in compressing the spring and uncovers the bore of the tube 148. Air enters through the aperture 149 and this causes the suction between the pistons 109 and 110 (Fig. 9) to decrease, so that, under the effect of the lever 118 having the counterweight 119, the throttling means for the induction passageway closes somewhat and causes the engine to slow down. At this moment the current generated by the generator and carried by the coil 142 decreases and the force of the spring 150 shifts the plunger 144 which retards entry of air in the tube 148, and there is obtained a position of equilibrium for a given engine speed. It will be understood that the ratio between the cross-sectional areas of the tube 151 and passageway 112 (Fig. 9) is so chosen that the entry of air in the space between the pistons 119 and 110 is practically without effect on the suction in the induction passageway of the engine.

If the force exerted by the spring 150 is such that the attraction of the coil 142 on the plunger 144 can only overcome this force when the engine reaches a predetermined maximum speed, the device acts as means limiting or controlling the maximum speed of the engine. This maximum could be changed by modifying the compression of the spring 150 by means of the plug 146.

The spring 150 could also be designed that the attraction of the coil 142 on the plunger 144 is capable of overcoming the force of the spring when the idling speed of the engine, corresponding to fully closed throttling means, exceeds the engine idling speed when cold, which occurs when the engine is hot. The device then operates as a device maintaining the idling speed constant irrespective of engine temperature.

To ensure that this last-mentioned device does not prevent accelerating the engine, there is also provided a controlling means for the device actuated by the control member controlling the engine operation in such manner so that movement of this control member beyond its position corresponding to idling speed of the engine puts the device in question out of action, for example by opening a switch inserted in the current supply circuit for the electromagnet.

It will be understood that means limiting the maximum speed and means limiting the idling speed when hot could coexist in the same servo-control.

Instead of constituting a separate device, the speed limiting means could be incorporated in the device itself, the body 141 could for example form a block with the body 101 (Figs. 7–9) or the body 131 (Fig. 10), the bore of the tube 148 controlled by the pointer 147 being in this case preferably that of a pipe or aperture extending through a partition located midway between the pistons 109 and 110.

A remote control operatable from the instrument panel could also be provided for setting the adjustment knob or plug 146 and thus modify the maximum speed of the engine or the idling speed when the engine is hot.

It will be understood that the invention is not restricted to the details described or shown in the drawings nor to the form of the particular embodiment described hereinbefore, this being given merely by way of example. Thus, among other things, the counterweight 119 would be mounted on an arm directly rigid with the throttling means or in any other suitable position in the linkage connected to the throttling means. Its position could be adjustable along the counterweight support arm or the counterweight could be replaced by a spring having preferably an adjustable tension.

Figure 12:
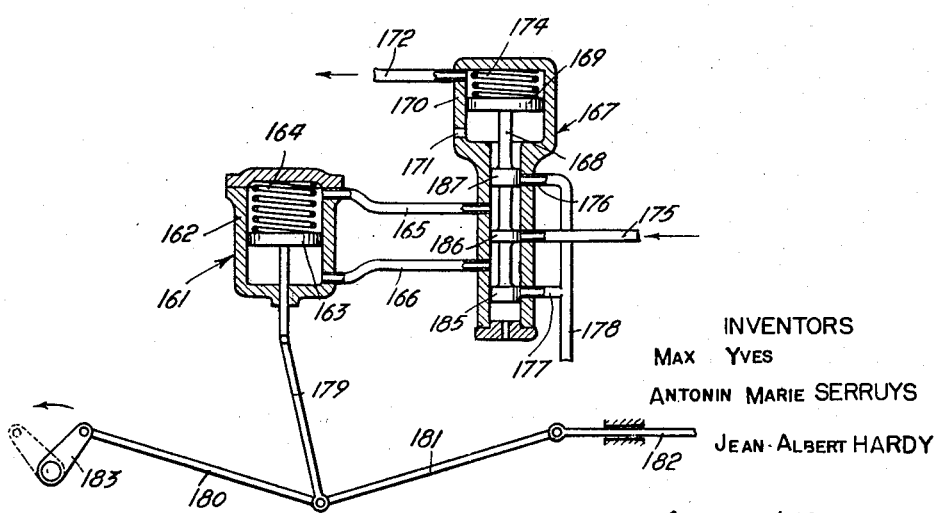
Fig. 12 is a diagrammatic view of another embodiment of the servo-control.

In particular, a modification has been shown in Fig. 12. In this modification the servo-control device comprises driving means which uses fluid under pressure, is generally designated by the reference character 161 and consists of a cylinder 162 in which is movable a piston 163 in opposition to the action of a spring 164 disposed between the piston 163 and one end of the cylinder 162. Pipes 165 and 166 respectively connect the opposing ends of the cylinder to a distributor of fluid under pressure generally designated by the reference character 167. This distributor comprises a slide 168 connected to a piston 169 movable in a cylinder 170 one end of which freely communicates with the atmosphere through an aperture 171, whereas the other end is in permanent communication through a pipe 172 with the induction passageway of the engine on the downstream side of the throttling means for this passageway. A spring 174 disposed between the end of the cylinder corresponding to the pipe 172 and the piston 169 exerts a force on the piston in the opposite direction to the action thereon of the pressure difference between the atmospheric pressure prevailing in the end of the cylinder due to the aperture 171 and the suction in the other end of the cylinder due to its permanent communication with the induction passageway of the engine through the pipe 172. Fluid under pressure, for example oil supplied by the lubricating system of the engine, is supplied to the distributor by the pipe 175 which communicates with the latter at a point between the pipes 165 and 166. Two other pipes 176 and 177 communicate with the distributor on either side of the orifices of the pipes 165 and 166 and are connected to a single pipe 178. The latter can communicate with the atmosphere if the fluid under pressure is air, or if it concerns a liquid, it is connected to the induction or return side of the device putting the liquid under pressure, for example a pump.

The stem of the piston 163 operates through the medium of a link 179 a set of levers 180, 181 which are, on the one hand, pivoted together and, on the other hand, pivoted respectively to the end of a linkage 182 connected to the control member controlling engine operation and to a linkage 183 connected to the throttling means for the induction passageway of the engine.

The device operates in the following manner:

The slide 168 has three flanges or enlarged portions 185, 186 and 187 which are so arranged that when the action of the spring 174 on the piston 169 balances that of the suction in the pipe 172, it is in the neutral position shown in Fig. 12 where the flanges 185, 186 and 187 respectively close the ends of the pipes 175, 176 and 177. The piston is then held stationary in the illustrated position by the fluid filling the cylinder 162, the pipes 165 and 166, and the body of the distributor between the outer flanges 185 and 187 of the slide. The throttling means connected to the arm 183 then occupies a definite position; the value of the suction corresponding to this position has been chosen to be the minimum admissible value in the induction passageway of the engine. However, the throttling means could be moved from this position by moving the linkage 182 in either direction which opens or closes to a greater extent the V formed between the links 180 and 181 and in consequence displaces the arm 183 connected to the throttling means. If, whatever the position of the linkage 182 and the links 180 and 181, the suction decreases, the piston 169 is moved by the force of the spring 174 the flange 186 uncovers the pipe 175 which is thus put in communication with the pipe 165, while the flange 185 uncovers the end of the pipe 177 which puts the latter in communication with the pipe 166. The piston 163 moves then under the joint effect of the spring 164 and the fluid under pressure in the pipe 175 which increases the angle of the V formed by the links 180 and 181, so that the opening of the throttling means decreases. The distributor and the piston 163 operate in the opposite manner when the suction increases; the fluid under pressure then acts on the piston 163 in the opposite direction to the spring 164 and the angle formed by the links 180 and 181 decreases, which results in an opening of the throttling means until this angle is zero or reaches a predetermined value by abutment of one link against the other; thenceforth any movement of the linkage 182 in either direction directly produces a related movement of the throttling means as if the two links 180 and 181 formed a single rigid lever and these were no servo-control, but the latter intervenes as soon as the suction decreases below the predetermined limit value. The travel of the control linkage 182 and that of the piston 163 and the link 179 are so arranged that the throttling means can be returned to its idling speed position irrespective of the position of the linkage 182.

If the cylinder 170 is disposed in a vertical position, the spring 174 can be dispensed with; the weight of the piston 169 and the distributor slide 168 would provide the force opposing the effect of the suction. The same is true of the cylinder 162 and the spring 164.

The compressed-fluid driving means, namely the piston 163, the cylinder 162 and the distributor 167, could be dispensed with, without departing from the scope of the invention, by connecting the link 179 directly to the piston rod 169. It will be understood that the means limiting the maximum speed of the engine and its idling speed when hot described hereinbefore with reference to Fig. 11, are applicable to the embodiment shown in Fig. 12, the air inlet pipe 151 (Fig. 11) being then connected to the cylinder of the piston subjected to the suction, on the same side as the pipe connecting this cylinder to the induction passageway of the engine.

Further, the throttling means of the induction passageway of the engine could be of any type balanced of unbalanced, in one piece or a plurality of pieces.

What ever the form of the servo-conical, it is advantageous, when the carburetor includes an accelerating pump, to provide between the control member controlling engine operation and this pump, such connection that it is possible, when actuating said control member, to actuate the device controlling the pump, which would otherwise be moved by a lever connected to the throttling means. This permits, when it is desired to start up the engine when cold, giving several strokes of the pump so as to render the mixture richer before starting. During operation of the engine the direct control of the pump facilitates acceleration at low speeds, since it acts quicker than when the pump is controlled by the throttling means whose opening is delayed by the play in the servo-control. To this end, the usual small lever controlling the pump fixed to the carburetor throttle pivot pin is detached and the pump is controlled either by a rigid rod or by a flexible control means by means of a transmission directly connected to the control member controlling engine operation or to one of the elements of the servo-control whose movement is not responsive to the suction.

What we claim is:

1. In a feeding arrangement for feeding an internal combustion engine with a flow of carburated air and comprising an inlet pipe for leading to the engine the carburated air, throttling means provided on said pipe, means responsive to the suction prevailing within said pipe downstream of said throttling means and operatively connected to said throttling means to urge the latter toward a position of minimum throttling effect, closing power means also connected to said throttling means to urge them permanently toward a position of maximum throttle effect, and said closing power means being arranged to urge the throttling means with a varying force depending on the actual position of said throttling means, this feature that said arrangement of the closing power means is such that said force decreases at least as the throttling means approach their fully opened position.

2. In a feeding arrangement for feeding an internal combustion engine with a flow of carburated air and comprising an inlet pipe for leading to the engine the carburated air, throttling means provided on said pipe, means responsive to the suction prevailing within said pipe downstream of said throttling means and operatively connected to said throttling means to urge the latter toward a position of minimum throttling effect, and closing power means also connected to said throttling means to urge them permanently toward a position of maximum throttle effect means capable of varying the value of the suction actually prevailing on said suction responsive means with reference to the value of the suction within the inlet pipe.

3. In a feeding arrangement as in claim 2, means responsive to the engine speed and arranged to control said means capable of modifying the value of the suction on the suction responsive means so as to make them actually operating to throttle the engine irrespective of the actual value of the suction in the inlet pipe on the engine being speeded up above a predetermined speed.

4. In a feeding arrangement as in claim 3 said engine speed responsive means being responsive to a high, not to be exceeded, engine speed.

5. In a feeding arrangement as in claim 3, adjusting means arranged for cooperation with said engine speed responsive means and whereby said predetermined speed for which the suction responsive means are made operating can be varied.

6. In a feeding arrangement as in claim 3, said engine speed responsive means being responsive to the idling engine speed, and means responsive to the engine feeding rate control means to make said engine speed responsive means inoperative on actuation of said control means to speed up the engine.

7. In a feeding arrangement for feeding an internal combustion engine with a flow of carburated air and comprising an inlet pipe for leading to the engine the carburated air, throttling means provided on said pipe, means responsive to the suction prevailing within said pipe downstream of said throttling means and operatively connected to said throttling means to urge the latter toward a position of minimum throttling effect, and closing power means also connected to said throttling means to urge them permanently toward a position of maximum throttle effect, said suction responsive means including a stationary cylinder the ends of which communicate with the atmosphere, two pistons movable in said cylinder and capable of relative motion with reference to one another and of mutual engagement, while leaving permanently some space between them, pipe means connecting said cylinder space between said pistons to the engine inlet pipe downstream of the throttling means, motion transmitting means operatively connecting one of said pistons to the throttling means to move the latter in dependence on the piston displacements and control means connected to the other piston to control the positions thereof.

8. In a feeding arrangement for feeding an internal combustion engine with a flow of carburated air and comprising an inlet pipe for leading to the engine the carburated air, throttling means provided on said pipe, means responsive to the suction prevailing within said pipe downstream of said throttling means and operatively connected to said throttling means to urge the latter toward a position of minimum throttling effect, and closing power means also connected to said throttling means to urge them permanently toward a position of maximum throttle effect, said suction responsive means including a stationary chamber, two partitioning members provided within said chamber, fluid-tightly dividing the latter in three compartments and adapted for displacement relatively to the chamber as with reference to one another and for mutual engagement, pipe means connecting the chamber space between said partitioning member to the engine inlet pipe downstream of the throttle means, the two other chamber compartments communicating with the atmosphere, motion transmitting means operatively connecting one of said partitioning members to the throttling means, and control means connected to the other partitioning member to control the positions thereof.

9. In a feeding arrangement as in claim 8, said chamber constituting an independent unit.

10. A servo-control unit for use in a feeding arrangement for internal combustion engines comprising an inlet pipe arranged to feed an engine with previously carburated air, throttling means adapted to more or less throttle this pipe, and control means connected to said throttling means to actuate the later and including a foot (or hand) controllable member, said servo-control unit intended to be inserted in said control means intermediate said controllable member and throttling means comprising a unitary structure including a chamber, two partitioning members provided within said chamber, fluidtightly dividing the latter in three compartments and adapted for displacement relatively to the chamber as with reference to one another and for mutual engagement, one of said member constituting the said abutment, the chamber space between said partitioning member being provided with an aperture for connection with said engine inlet pipe, the other chamber compartments communicating with the atmosphere, motion transmitting means connected to one of said partitioning members and adapted to be connected to said throttling means, and other motion transmitting means connected to the other of said partitioning members and connectable to said foot (or hand) controllable member.

References Cited in the file of this patent

UNITED STATES PATENTS

| | | |
|---|---|---|
| 2,585,814 | McDonald | Feb. 12, 1952 |
| 2,588,136 | Mallory | Mar. 4, 1952 |
| 2,780,210 | Renken | Feb. 5, 1957 |